United States Patent
Chen et al.

(10) Patent No.: US 11,977,974 B2
(45) Date of Patent: May 7, 2024

(54) COMPRESSION OF FULLY CONNECTED / RECURRENT LAYERS OF DEEP NETWORK(S) THROUGH ENFORCING SPATIAL LOCALITY TO WEIGHT MATRICES AND EFFECTING FREQUENCY COMPRESSION

(71) Applicant: International Business Machines Corporation, Armonk, NY (US)

(72) Inventors: Chia-Yu Chen, Westchester, NY (US); Jungwook Choi, Elmsford, NY (US); Kailash Gopalakrishnan, San Jose, CA (US); Suyog Gupta, Sunnyvale, CA (US); Pritish Narayanan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1254 days.

(21) Appl. No.: 15/827,465

(22) Filed: Nov. 30, 2017

(65) Prior Publication Data

US 2019/0164050 A1    May 30, 2019

(51) Int. Cl.
*G06N 3/08* (2023.01)
*G06F 17/14* (2006.01)

(52) U.S. Cl.
CPC ............. *G06N 3/08* (2013.01); *G06F 17/147* (2013.01)

(58) Field of Classification Search
None
See application file for complete search history.

(56) References Cited

U.S. PATENT DOCUMENTS 6,805,668 B1 * 10/2004 Cadwell ............... A61B 5/7267
                                                       706/924
9,240,184 B1    1/2016 Lin et al.
(Continued)

FOREIGN PATENT DOCUMENTS

CN    1578968 A    2/2005
CN    106355248 A    1/2017
(Continued)

OTHER PUBLICATIONS

D. Katz & R. Gentile. Baseline JPEG compression juggles image quality and size. EE Times. Jan. 23, 2003. [retrieved from internet on Jan. 8, 2022] <URL: https://www.eetimes.com/baseline-jpeg-compression-juggles-image-quality-and-size/> (Year: 2003).*
(Continued)

*Primary Examiner* — Bion A Shelden
(74) *Attorney, Agent, or Firm* — Amin, Turocy & Watson, LLP

(57) ABSTRACT

A system, having a memory that stores computer executable components, and a processor that executes the computer executable components, reduces data size in connection with training a neural network by exploiting spatial locality to weight matrices and effecting frequency transformation and compression. A receiving component receives neural network data in the form of a compressed frequency-domain weight matrix. A segmentation component segments the initial weight matrix into original sub-components, wherein respective original sub-components have spatial weights. A sampling component applies a generalized weight distribution to the respective original sub-components to generate respective normalized sub-components. A transform component applies a transform to the respective normalized sub-components. A cropping component crops high-frequency weights of the respective transformed normalized sub-components to yield a set of low-frequency normalized
(Continued)

sub-components to generate a compressed representation of the original sub-components.

12 Claims, 9 Drawing Sheets
(6 of 9 Drawing Sheet(s) Filed in Color)

(56) References Cited

U.S. PATENT DOCUMENTS

| | | | |
|---|---|---|---|
| 9,466,292 | B1 | 10/2016 | Lei et al. |
| 2007/0233477 | A1 | 10/2007 | Halowani et al. |
| 2015/0324690 | A1 | 11/2015 | Chilimbi et al. |
| 2016/0078863 | A1 | 3/2016 | Chung et al. |
| 2016/0292589 | A1 | 10/2016 | Taylor, Jr. et al. |
| 2018/0239992 | A1* | 8/2018 | Chalfin ............. G06K 9/00986 |
| 2018/0293758 | A1* | 10/2018 | Bar-On ............... H04N 19/436 |
| 2019/0087729 | A1* | 3/2019 | Byun .................... G06N 3/045 |

FOREIGN PATENT DOCUMENTS

| | | |
|---|---|---|
| CN | 106485316 A | 3/2017 |
| CN | 107209873 A | 9/2017 |

OTHER PUBLICATIONS

Y. Wang et al. CNNpack: Packing Convolutional Neural Networks in the Frequency Domain. NIPS 2016. [retrieved from internet on Jan. 12, 2022] <URL: https://proceedings.neurips.cc/paper/2016/file/3636638817772e42b59d74cff571fbb3-Paper.pdf> (Year: 2016).*

J.H. Ko et al. Adaptive Weight Compression for Memory-Efficient Neural Networks. D.A.T.E. 2017. Mar. 2017. [retrieved from internet on Jan. 12, 2022] <URL: https://ieeexplore.ieee.org/abstract/document/7926982> (Year: 2017).*

G. Uma Vetri Selvi & R. Nadarajan. DICOM Image compression using Bilinear Interpolation. IEEE. Nov. 2010. [retrieved from internet on Jan. 12, 2022] <URL: https://ieeexplore.ieee.org/document/5687797> (Year: 2010).*

DataGenetics. Discrete Cosine Transformations. Archived on Jul. 27, 2017. [Retrieved from archive on Aug. 7, 2022] <URL: https://web.archive.org/web/20170727210714/https://datagenetics.com/blog/november32012/index.html> (Year: 2017).*

E. Roberts. Data Compression. Archived on Jul. 15, 2014. [Retrieved from archive on Aug. 7, 2022] <URL:https://web.archive.org/web/20140715045652/https://cs.stanford.edu/people/eroberts/courses/soco/projects/data-compression/lossy/jpeg/coeff.htm> (Year: 2014).*

International Search Report and Written Opinion received for PCT Application Serial No. PCT/IB2018/059500 dated Mar. 13, 2019, 9 pages.

Examination report received for GB. Application Serial No. GB2009750 dated Aug. 5, 2020, 7 pages.

Moczulski, et al., ACDC: A Structured Efficient Linear Layer, Published as a conference paper at ICLR Mar. 19, 2016, 12 pages.

Chen, et al., "Compressing Convolutional Neural Networks," arXiv:1506.04449v1 [cs.LG] Jun. 14, 2015, 9 pages.

Zou, et al., High Speed Deep Networks Based on Discrete Cosine Transformation, ICIP 2014, 5 pages.

Notice of Reasons for Refusal received for Japanese Patent Application Serial No. 2020-529192 dated May 25, 2022, 6 pages.

Koutnik et al., "Evolving Neural Networks in Compressed Weight Space", GECCO'10: Proceedings of the 12th annual conference on Genetic and evolutionary computation [online], 2010, pp. 619-625.

Notice of Reasons for Refusal received for Japanese Patent Application Serial No. dated 2020-529192, dated Nov. 29, 2022, 4 pages (Including English Translation).

Decision to Grant a Patent received for Japanese Patent Application Serial No. dated 2020-529192, dated May 30, 2023, 5 pages (Including English Translation).

Office Action received for Chinese Patent Application Serial No. 201880074735.5 dated May 17, 2023, 6 pages.

Notice of Grant received for Chinese Patent Application Serial No. 201880074735.5 dated Nov. 30, 2023, 2 pages.

Ko, et al., "Adaptive Weight Compression for Memory-Efficient Neural Networks," Published in: Design, Automation & Test in Europe Conference & Exhibition (DATE), 2017, Date of Conference: Mar. 27-31, 2017, DOI: 10.23919/DATE.2017.7926982.

Koutnik, et al., "Evolving Neural Networks in Compressed Weight Space," GECCO '10: Proceedings of the 12th annual conference on Genetic and evolutionary computation, Jul. 2010pp. 619-626, https://doi.org/10.1145/1830483.1830596.

* cited by examiner

FIG. 8 ical field

COMPRESSION OF FULLY CONNECTED / RECURRENT LAYERS OF DEEP NETWORK(S) THROUGH ENFORCING SPATIAL LOCALITY TO WEIGHT MATRICES AND EFFECTING FREQUENCY COMPRESSION

TECHNICAL FIELD

The subject disclosure relates generally to reducing data size in connection with training neural network(s) by imposing spatial locality to weight matrices and effecting frequency compression.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate the production of a final product using neural networks in a particular context are described.

In accordance with an embodiment, a system for compressing data during neural network training, comprises: a memory that stores computer executable components and neural network data; a processor that executes computer executable components stored in the memory, wherein the computer executable components comprise: a receiving component that receives neural network data in the form of a weight matrix; a segmentation component that segments the weight matrix into original sub-components, wherein respective original sub-components have spatial weights; a sampling component that applies a generalized weight distribution to the respective original sub-components to generate respective normalized sub-components; a transform component that applies a transform to the respective normalized sub-components; and a cropping component that crops high-frequency weights of the respective transformed normalized sub-components to generate a set of low-frequency normalized sub-components to generate a compressed representation of the original sub-components.

In accordance with yet another embodiment, a computer-implemented method, comprises employing a processor and memory to execute computer executable components to perform the following acts: initializing a weight matrix segmented into original sub-components, wherein respective original sub-components have spatial weights; applying a generalized weight distribution to the respective original sub-components to generate respective normalized sub-components; applying a transform to the respective normalized sub-components, generating low and high frequency weights; and cropping the high-frequency weights of the respective transformed normalized sub-components to generate a set of compressed, normalized sub-components.

Another embodiment includes a computer program product having stored thereon the aforementioned computer executable components

DESCRIPTION OF THE DRAWINGS

The patent or application file contains at least one drawing executed in color. Copies of this patent or patent application publication with color drawing(s) will be provided by the office upon request and payment of the necessary fee.

FIG. 8 illustrates alternative implementations to facilitate increasing learning efficiency based on selective manipulation of spatial matrices in accordance with implementations.

DETAILED DESCRIPTION

Figure 1:
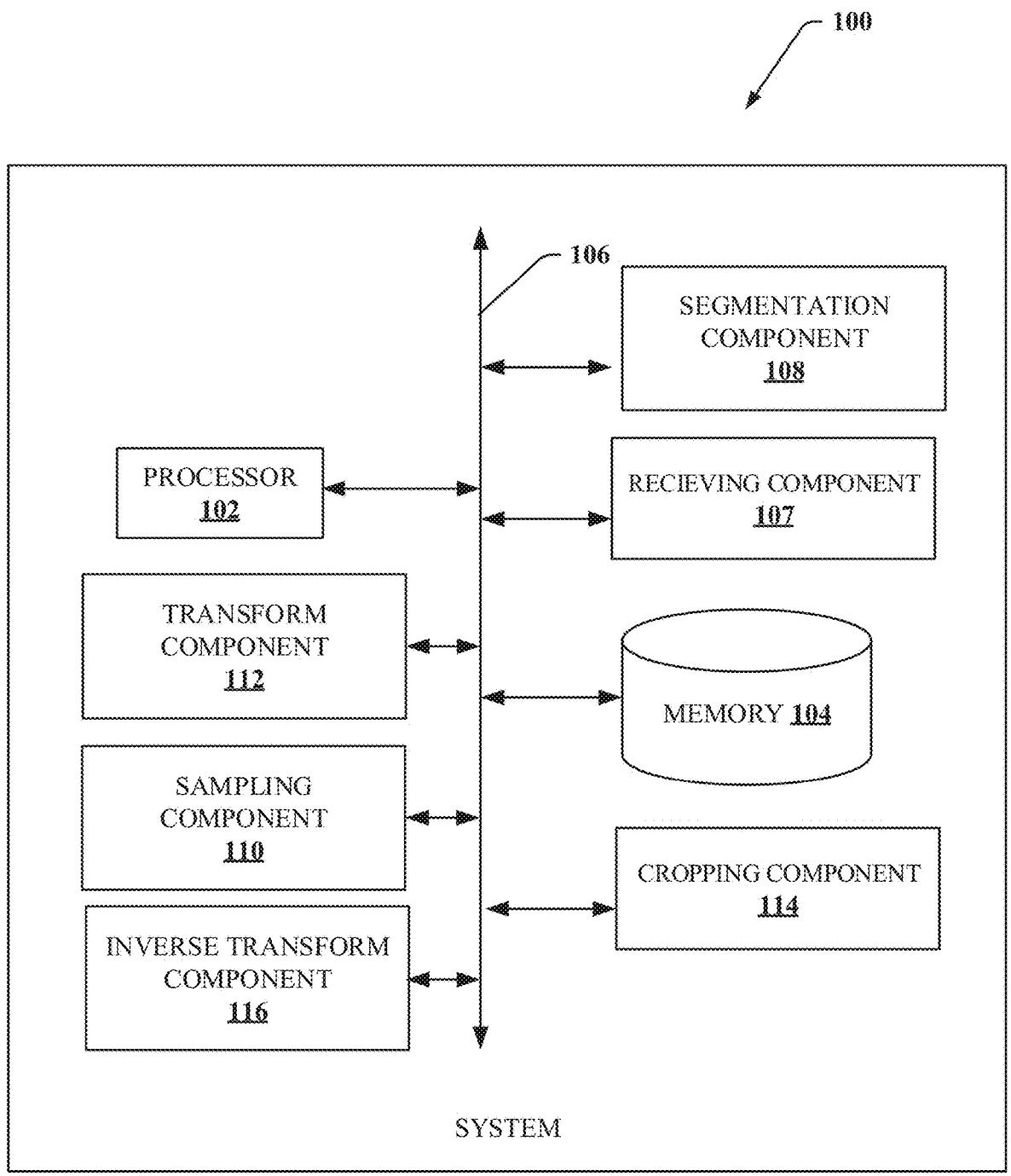
FIG. 1 illustrate a block diagram of an example system that use transform(s) and imposes spatial locality to weight matrices to generate compressed dense low frequency weights to train neural networks in accordance with an implementation.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Neural networks are rapidly gaining traction in connection with collecting and moving critical data from the physical world and processing such data in the digital world. Over the past decade, using neural networks "deep learning (DL)" has revolutionized various disciplines including speech recognition, image recognition, natural language processing, genome sequencing and many other domains. This rapid progress has been enabled through availability of massive amounts of labeled data in such domains coupled with enhanced computational capabilities provided by high performance graphical processing units (GPUs). Despite various impressive technological advances, it can take days to weeks to train distributed neural networks (DNNs), even on cutting edge hardware. Furthermore, given the large number of trainable model parameters (also known as weights), communication bandwidth can often limit number of distributed learners that can prevent full utilization. Two significant reasons why training neural networks can take long are that the neural networks are often voluminous and contain millions of parameters (referred to as weights) to be optimized; and given the vast number of parameters, hundreds of thousands of examples are often required to train a neural network, which can consume substantial processing, memory and communication resources.

Current computing systems are typically setup with a processing unit and memory. Even with highly efficient and powerful computer processing units (CPUs), situations can arise where a bottleneck forms between the CPU and memory—this is referred to as "processor memory bottleneck" (also referred to as a von Neumann bottleneck). Data must continually be supplied to the CPU for it to run at optimal capacity. Reducing amount of data transmitted between the CPU and memory or between a centralized parameter server and multiple distributed computing nodes can greatly improve efficiency and performance of a neural network. For training a typical neural network one would generally initialize weights to complete random numbers and then allow the network to train. In effort to improve such process, instead of initializing weights to random numbers in layers of each neural network, spatial locality (where weights in a particular region are similar to each other) is enforced on weight matrices at initialization which facilitates frequency compression. For spatial locality, there is often minor change from one weight to another in particular regions; through frequency transform, the data can be segregated into a small number of low frequency components. In this context, developing 'deep learning friendly' compression techniques for reducing memory footprint, and consequently bandwidth requirement of transporting weight matrices, can accelerate both software and hardware frameworks for deep learning.

A convolutional neural network (CNN) refers to computing systems inspired by biological neural networks that learn to do tasks by considering examples generally without task-specific programming. One goal of a neural network approach is to solve problems in same manner as a human brain. Over time, attention focused on matching specific mental abilities, leading to deviations from biology such as backpropagation (e.g., a method to calculate gradient of a loss function (e.g., produces cost associated with a given state) with respect to weights in the CNN) or passing information in a reverse direction and adjusting the network to reflect such information. For example, in image recognition, CNNs might learn to identify images that contain facial features by analyzing example images that have been manually labeled as "facial feature" or "no facial feature" and using the analytic results to identify faces in other images. In artificial networks with multiple hidden layers, initial layers might detect primitives (e.g., a pupil in an eye, an iris, eyelashes, etc.) and the output is fed forward to deeper layers that perform more abstract generalizations (e.g., eye, mouth . . . ) and so on until final layers perform complex object recognition (e.g., face). CNNs have found considerable use in applications difficult to express by a traditional computer algorithm using rule-based programming.

To better understand artificial neural computing, it is helpful to know first how a conventional 'serial' computer and its software process information. A serial computer has a central processor that can address an array of memory locations where data and instructions are stored. Computations are made by the processor reading an instruction as well as data the instruction requires from memory addresses, the instruction is then executed and results are saved in a specified memory location. In a serial system (and a standard parallel one as well) computational steps are deterministic, sequential and logical, and state of a given variable can be tracked from one operation to another. In comparison, CNNs are not sequential or necessarily deterministic. There are no complex central processors, rather there are many simple ones that generally do nothing more than take a weighted sum of inputs from other processors. CNNs do not execute programmed instructions; they respond in parallel (e.g., either simulated or actual) to a pattern of inputs presented thereto.

One or more embodiments described herein provides for generation and employment of neural network model(s) that facilitate identifying and processing data to achieve an intended result of utilizing the optimum compressed data set with negligible data loss. Employing neural networks for various computational objectives can be difficult based on typical requirements needed to accomplish such tasks. Intense data interaction and CPU usage can be limiting in achieving highest quality results. High resolution images or videos are often used as inputs to neural networks for recognition and inference operations. Large neural network sizes can be due to substantial input pixel count and hidden layer sizes. In the current state of art, these images can contain tremendous amounts of data of up to and over 160 billion parameters. The length of time and computing power for processing this level of data can be prohibitive to completing a desired classification task. Accordingly, there is a need for highly efficient computing on an edge, particularly for domains such as cognitive Internet-of-Things (IoT) and data mining within storage that can utilize exabytes up to and including yottabytes ($1000^8$ bytes).

In current state of the art, many neural networks are operated on dense images that are reduced (e.g., compressed). Discrete cosine transforms (DCTs) are commonly used in Joint Photographic Experts Group (JPEG) compression. DCTs employed herein transform images into a frequency domain Real word images typically have spatial locality and relevant information is often concentrated in low frequency components. The subject innovation provides a technique to move from operating large and complex neural networks (that typically require considerable power, processing capabilities, memory and bandwidth) acting on dense images with significant data to acting on smaller and smaller inputs based on a frequency transform compression method that differentiates over the state of the art, and results in significant gains in neural network speed and performance. There is an inherent data redundancy or similarity due to correlation between neighboring pixels (e.g., displayed in images or video inputs to these neural networks) that can be exploited to improve an entire process of current data calculation strategies. This is the spatial locality concept that drives the subject compression process. Instead of initializing weights to random numbers in layers of each neural network, spatial locality (e.g., weights in a particular region similar to each other) is imposed on weight matrices to facilitate frequency compression and reduce size of data transmitted across a distributed neural network. Oftentimes, for spatial locality, there is minor change from one weight to another in particular regions; with frequency transform such data can be segregated into small number of low frequency components. In this context, 'deep learning friendly' compression techniques are facilitated by reducing memory footprint and bandwidth requirement associated with transporting weight matrices, which can improve software and hardware frameworks for deep learning.

FIG. 1 illustrates a block diagram of an example, non-limiting system 100 that facilitates analyzing large sets of data and training a neural network to provide an optimum result in a particular context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

The system 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a receiving component 107, a segmentation component 108, a sampling component 110, a transform component 112, a cropping component 114 and an inverse transform component 116. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, the memory 104 can store computer executable components executable by the processor 102. The receiving component 107 can receive input weight matrices and transport data to a respective destination. The segmentation component 108 can segment the initial weight matrices into the original sub-components. The sampling component 110 can apply a general weight distribution to the original sub-components. The transform component 112 can apply a transform (e.g., DCT) to the sub-block of spatial weights to generate the weight with pertinent data in a low frequency section. The cropping component 114 can clip off high frequency components so that a low frequency data set remains with concentrated information. The inverse transform component 116 can transform the compressed data set from the frequency domain back to the spatial domain. It is to be appreciated that the subject innovation is not limited to use of DCT transforms, and any suitable frequency transform (e.g., Fourier transform, LaPlace transform, Wavelet transform, Z-transform . . . ) can be employed.

The subject innovation facilitates reduction in amount of data transmitted between a computer processing unit (CPU) and memory, or between a centralized parameter server and multiple distributed computing nodes in connection with improving efficiency and performance of a neural network. The system 100 instead of initializing weights to random numbers in layers of each neural network, spatial locality (e.g., weights in a particular region are similar to each other) is imposed on weight matrice(s) to facilitate frequency compression and reduce size of data transmitted across a distributed neural network. Oftentimes, for spatial locality, there is minor change from one weight to another in particular regions; with frequency transform such data can be segregated into small number of low frequency components. In this context, 'deep learning friendly' compression techniques are facilitated by reducing memory footprint and bandwidth requirement associated with transporting weight matrices, which can improve software and hardware frameworks for deep learning.

In various implementations, it is to be appreciated that spatial locality enforcement, and interpolation are done at beginning of training, when the weights are initialized. Instead of initializing the entire weight matrix at random, corners of each sub-block are initialized at random. Then interpolation is done to fill up the other values within each sub-component. The training process involves tweaking the weights over many examples and epochs. When weights are required to be transmitted, e.g., from a sender to a receiver, where the sender is a CPU/parameter server/learner and the receiver is memory/learner, compression is performed at the sender. Padding and decompression is performed at the receiver, such that data transmitted on the channel is minimized. However, initialization and interpolation steps are subsequently not performed.

The various components (e.g. receiving component 107, segmentation component 108, sampling component 110, transform component 112, cropping component 114, inverse transform component 116 and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

Certain embodiments of devices described herein can optionally employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, z=(z1, z2, z3, z4, . . . , zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 2:
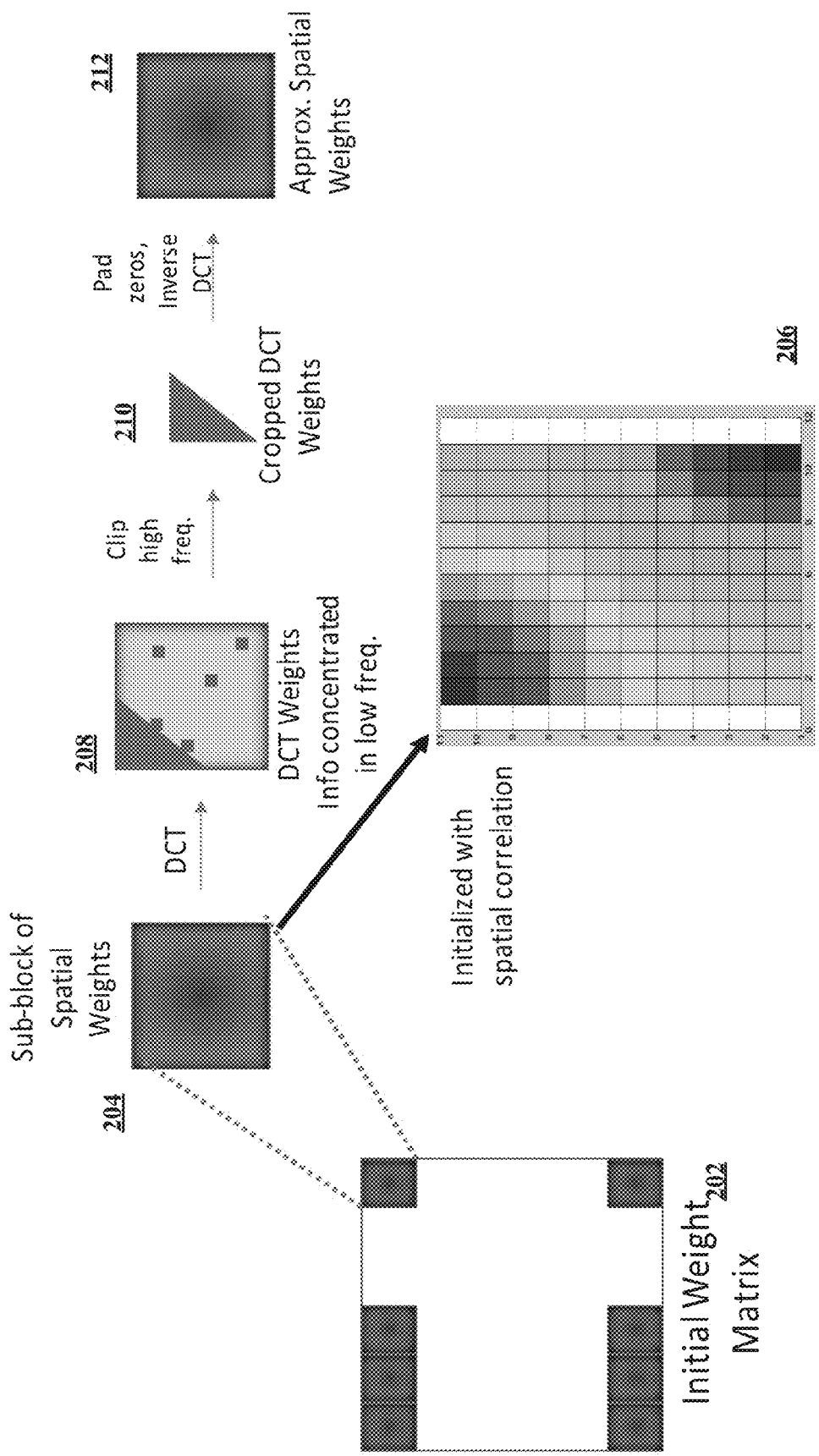
FIG. 2 illustrates a process that use transform(s) and imposes spatial locality to weight matrices to generate compressed dense low frequency weights to train neural networks in accordance with an implementation.
Figure 3:
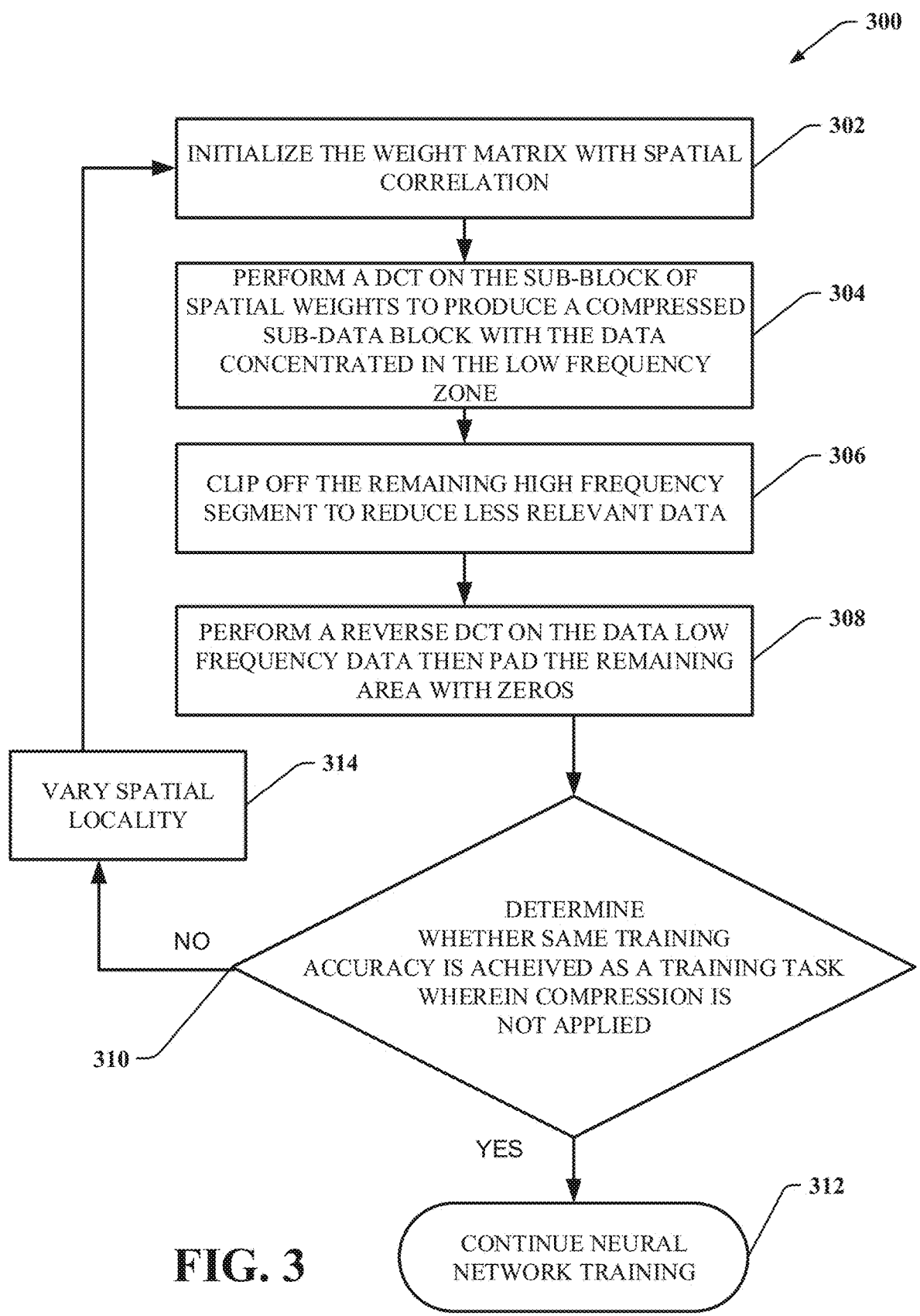
FIG. 3 illustrates the process flow diagram that imposes spatial locality to weight matrices to generate compressed dense low frequency weights to train neural networks in accordance with an implementation.

FIG. 2 illustrates an embodiment of a process of enforcing spatial locality in frequency component/recurrent layers at initialization. An initial weight matrix 202 is broken up into smaller regions (sub blocks) 204 where parameters within that region have some degree of spatial correlation. The corner weight values of each sub-block can be sampled from a distribution of random numbers. In one embodiment, this distribution could be the same distribution as used for random initialization of the weight matrix were the technique not employed. Bilinear interpolation 206 can be used to fill up remaining values. At this point, the server contains unified copies of the weights, and it transforms respective sub-components into the frequency domain using DCT or another transform. An exemplar sub block 208 contains significant relevant data in the low frequency segment with the higher frequency segment containing data with little value or zeroes. Subsequently the 208 data block high frequency component region is clipped off leaving the low frequency portion only region (e.g., triangle) 210. This is the compressed frequency representation of the weights that the server sends out to each receiver. The reduced size of the compressed frequency domain representation of the weights facilitates improved efficiency and performance, by reducing size of data transmitted. At the receiver(s), the empty section of the region 210 is padded with zeroes and an inverse transform (e.g., inverse DCT transform) is performed to yield a data block of spatial weights 212 that are an approximate representation of the original data block 204. It is to be appreciated that the subject innovations are not limited to corners or certain shapes of regions of relevance. Rather, the innovation is intended to encompass any suitable technique for imposing spatial locality (e.g., weights in a particular region are similar to each other) on weight matrices to facilitate frequency compression and reduce size of data transmitted across a distributed neural network FIG. 3 illustrates a flow diagram 300 in accordance with an implementation. At 302, a weight matrix is initialized with spatial correlation (e.g., using segmentation component 108 and sampling component 110). At 304, a transform (e.g., DCT transform) is performed on a sub-block of spatial weights to produce a compressed sub-data block with the data concentrated in the low frequency zone (e.g., using transform component 112). At 306, remaining high frequency segments are clipped to reduce less relevant data (e.g., using cropping component 114). At 308, an inverse transform (e.g., inverse DCT) is performed (e.g., using inverse transform component 116) on the data low frequency data and then a remaining area is padded with zeros. At 310, an approximate version of the weights is obtained at a receiver, and used to train the neural network. By evaluating the technique on established neural network benchmarks, it can be determined whether same training accuracy is achieved as a training task wherein compression is not applied. If yes, at 312 training of the neural network is continued. If no, spatial locality is varied at 314 and the process repeated at 302. With respect to acts 310, 312 and 314, checking whether same efficiency is achieved as a no compression baseline is optionally performed to validate the innovation with respect to certain standard benchmarks (e.g., it is unrealistic in a real-world implementation to have a priori knowledge of what accuracy should be without compression).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 4:
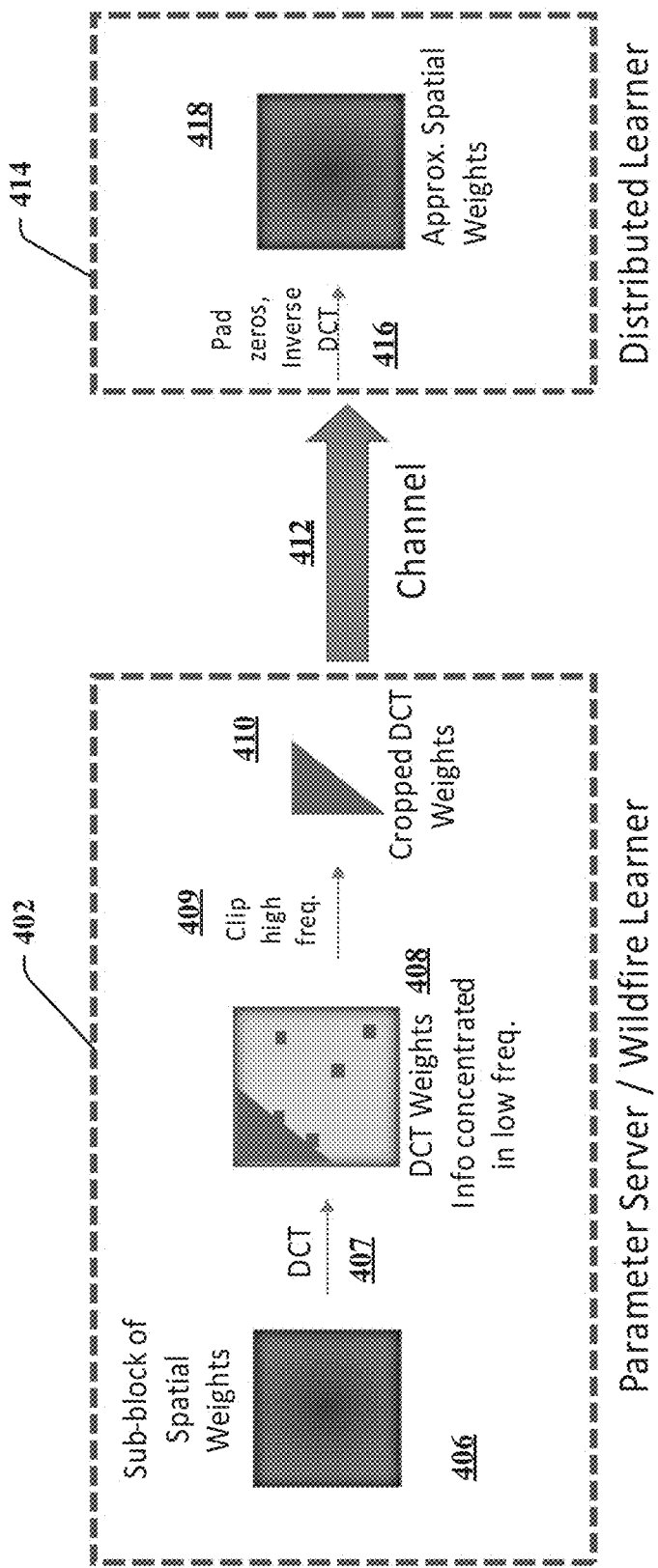
FIG. 4 illustrates a model that distributes computing across multiple learners such that respective learners will have an individual copy of a neural network and examples to train in accordance with an implementation, and will exchange weight information with one another and/or with one or more parameter servers during training.

FIG. 4 illustrates a distributed learner model in accordance with the subject innovation. A parameter server or a distributed learner 402 applies a transform 407 on a weight matrix with spatial correlation 406, to transform the spatial components to frequency domain. At 408, relevant information is concentrated at low frequency. High frequency components at clipped at 409 to result in a set of cropped DCT weights 410 that contain relevant information in a compressed manner. The compressed DCT weights are transmitted at 412 to a distributed learner 414 where an inverse transform is performed and any remaining area is padded with zeros at 416 to result in a set of approximate spatial weights 418 for training respective neural networks. This model distributes computing across multiple learners. Each learner will have an individual copy of the neural network and examples to train on. Subsequently after each learner trains, each learner will send information to the parameter server which will synchronize weight updates across the multiple learners and transfer new updated weights to each learner. This model will allow the ability to distribute the work load symmetrically—for example: a centralized sever only will require "10 hours of time to exercise 10 epochs". With the distributed learner system, it is possible to have 10 learners and the entire work load can take just one hour.

Figure 5:
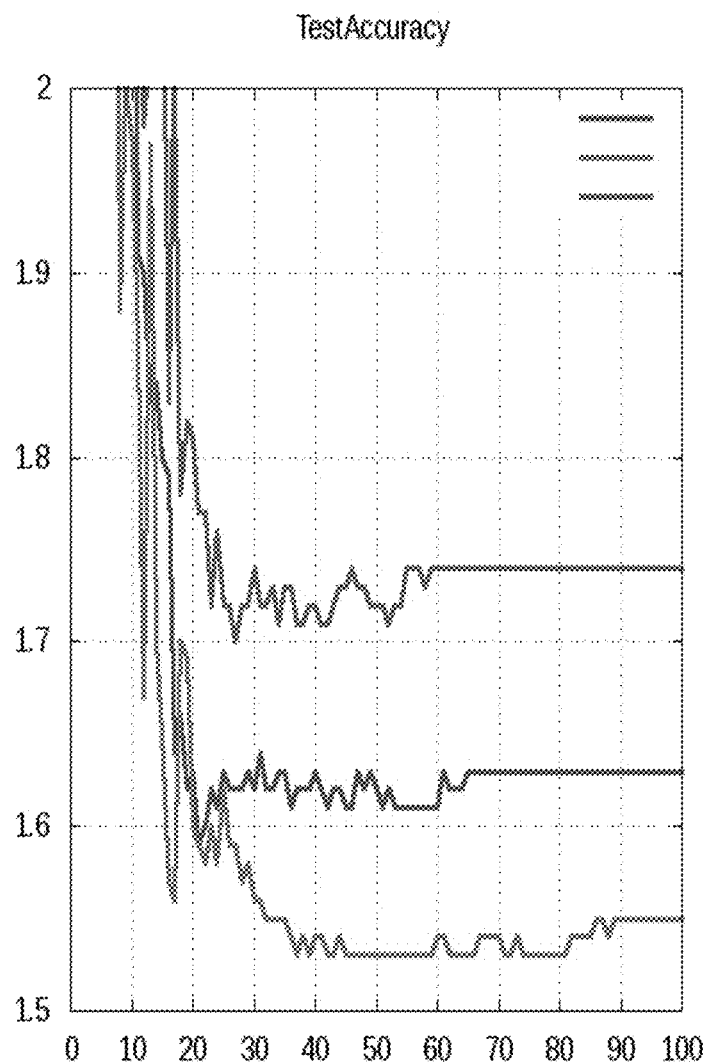
FIG. 5 illustrates a percentage error versus number of epochs of neural network training data chart, using a benchmark referred to as MNIST in accordance with an implementation.

FIG. 5 illustrates the results of a compression test case. There is compression applied to layers 1 (784×1008) and a second layer (1008×1008) of a three-layer neural network, and the benchmark is referred to as MNIST—a dataset of handwritten digits between 0-9. The dataset contains 60000 training images that are used to train the neural network and 10000 test images that are used to evaluate the accuracy of the neural network in recognizing images that it has not explicitly been trained on. The data chart reflects that using this subject compression method has no tangible impact on accuracy of a learned task. The example on the right (504) is for test data provided to the neural network after some length of training measured in epochs, wherein each epoch represents one full pass of 60000 images of the training data set. The chart shows accuracy is virtually equal to the baseline case where compression is not employed. For a test with 100 Epochs, the test results show ~98.4% accuracy (~1.6% error) for the baseline and for 8× compression, and only slightly higher error (~1.7%) for 16× compression.

Figure 6:
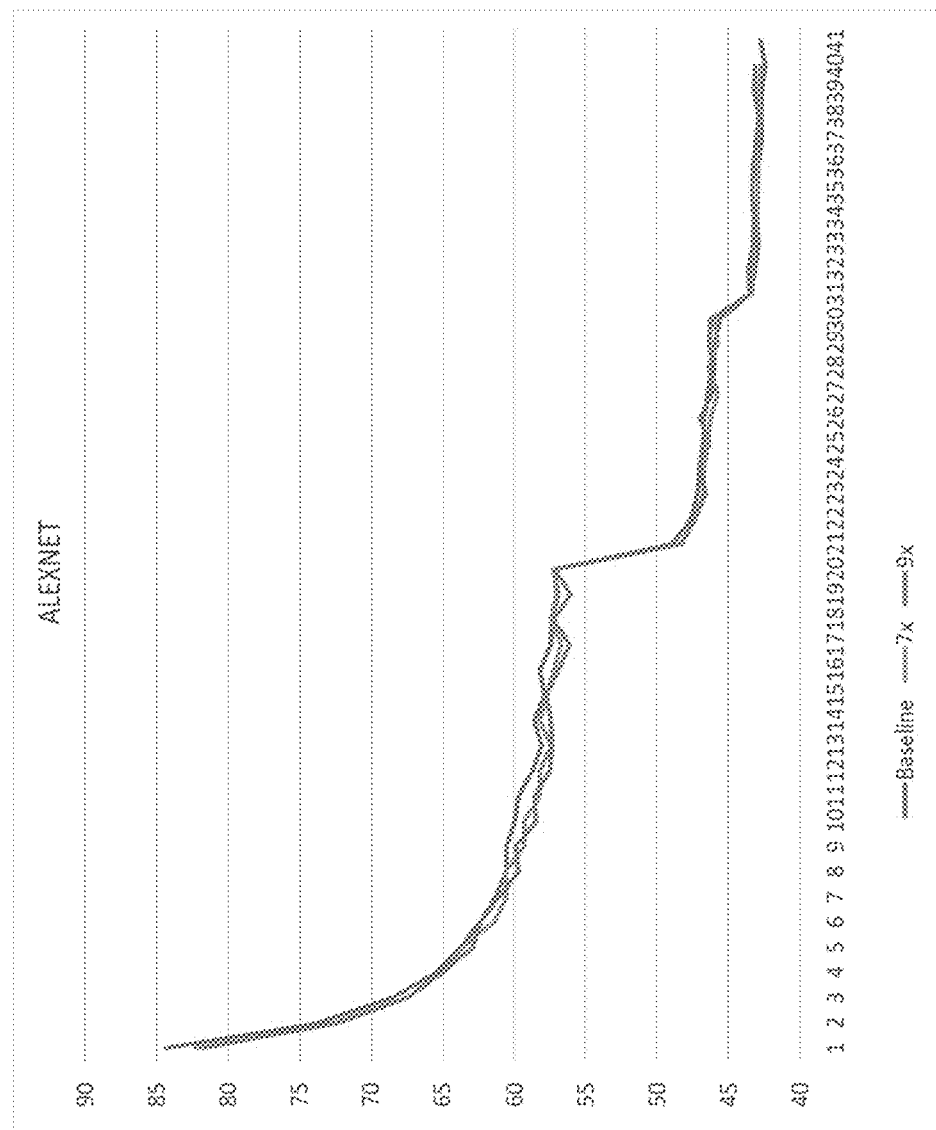
FIG. 6 illustrates a percentage error versus number of epochs of neural network training data chart, using a benchmark referred to as Imagenet, and a neural network configuration referred to as Alexnet in accordance with an implementation.

FIG. 6 illustrates additional compression comparison data. A larger benchmark dataset referred to as ImageNet is trained using Alexnet (a specific neural network configuration with millions of parameters (weights)). This chart reflects that that at 7× compression, there is zero measurable loss and at 9× there is only 0.4% data loss. From observing the chart, it is clear the both the 7× and 9× data results track baseline extremely well.

Figure 7:
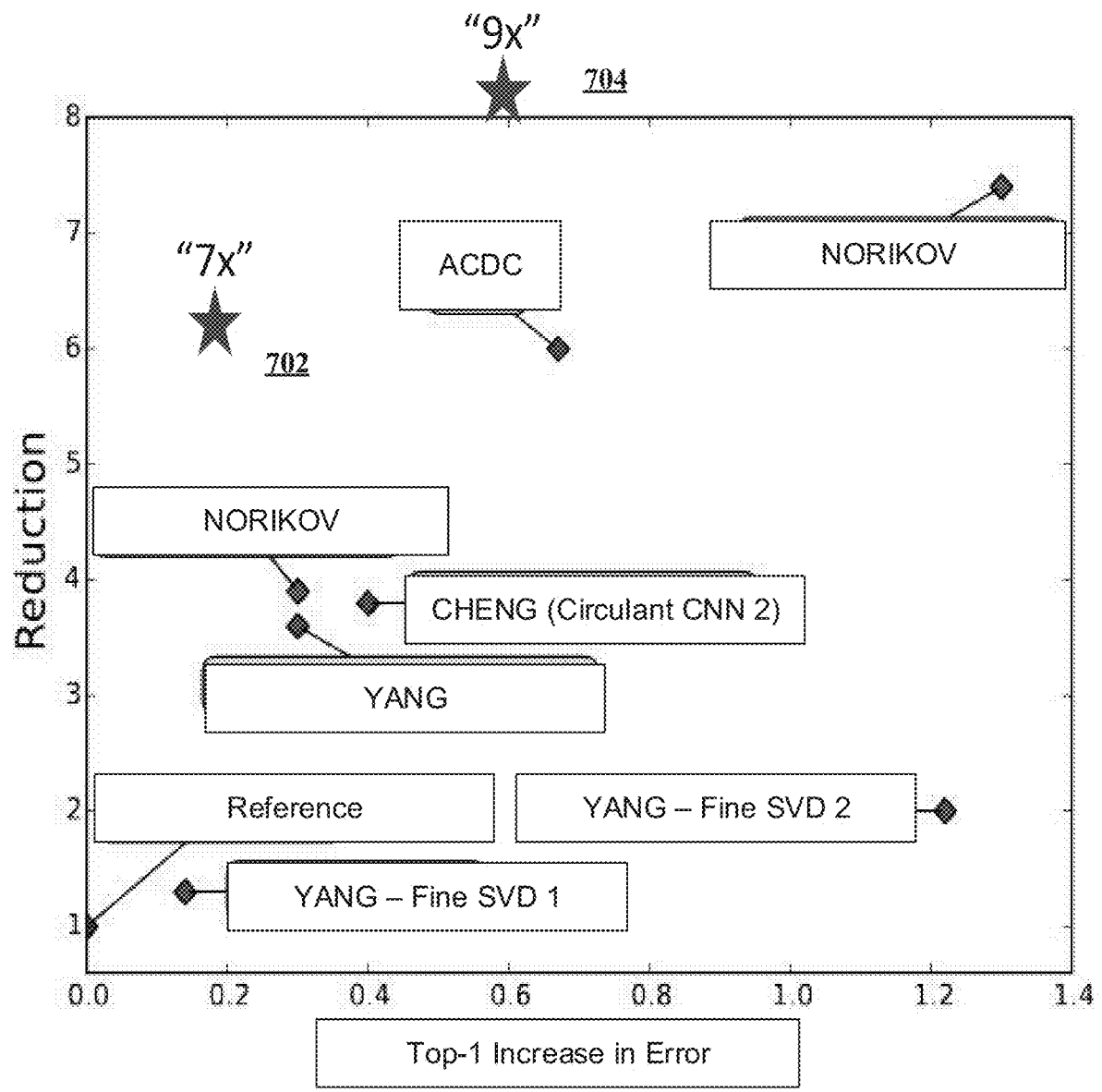
FIG. 7 illustrates a comparison chart between an ACDC method testing results and other state of the art methods against the herein described innovation.

FIG. 7 reflects comparison results using the subject innovation as compared against other convention techniques (e.g., ACDC, Cheng, Yang, Novikov . . . ). The chart at 702 indicates that at 7× compression the ACDC method had a 0.7% error increase vs. the baseline while at the same compression rate as the subject innovation which has only a 0.2% error increase vs. the baseline. In addition, at an error increase of 0.6%, the ACDC method could compress up to 6× while the subject innovation provides 9× compression. This data evinces the subject innovation provides improved accuracy at same compression ratio, and greater compression ratio at same accuracy compared to conventional techniques.

Figure 8:
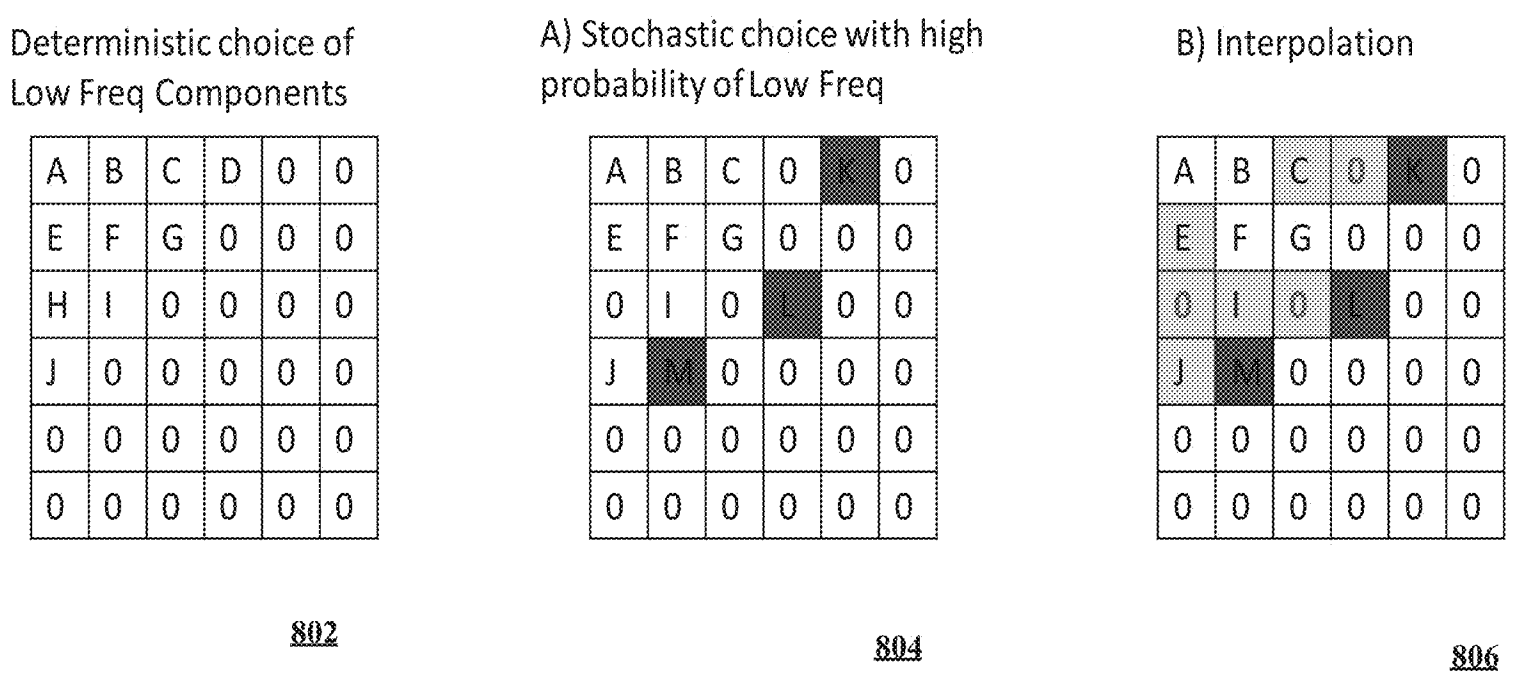

FIG. 8 illustrates potential further advances in increasing learning efficiency based on selective manipulation of spatial matrices—different alternatives are displayed. Diagram 802 depicts a basic principle of removing high frequency components as discussed supra. Diagram 804 depicts a technique that holds on to some higher frequency components instead of zeroing all out, this can reduce loss during transformation further. Diagram 806 shows further interpolation across high frequency components; instead of keeping these values as zero, one could potentially interpret them further based on neighboring values.

Figure 9:
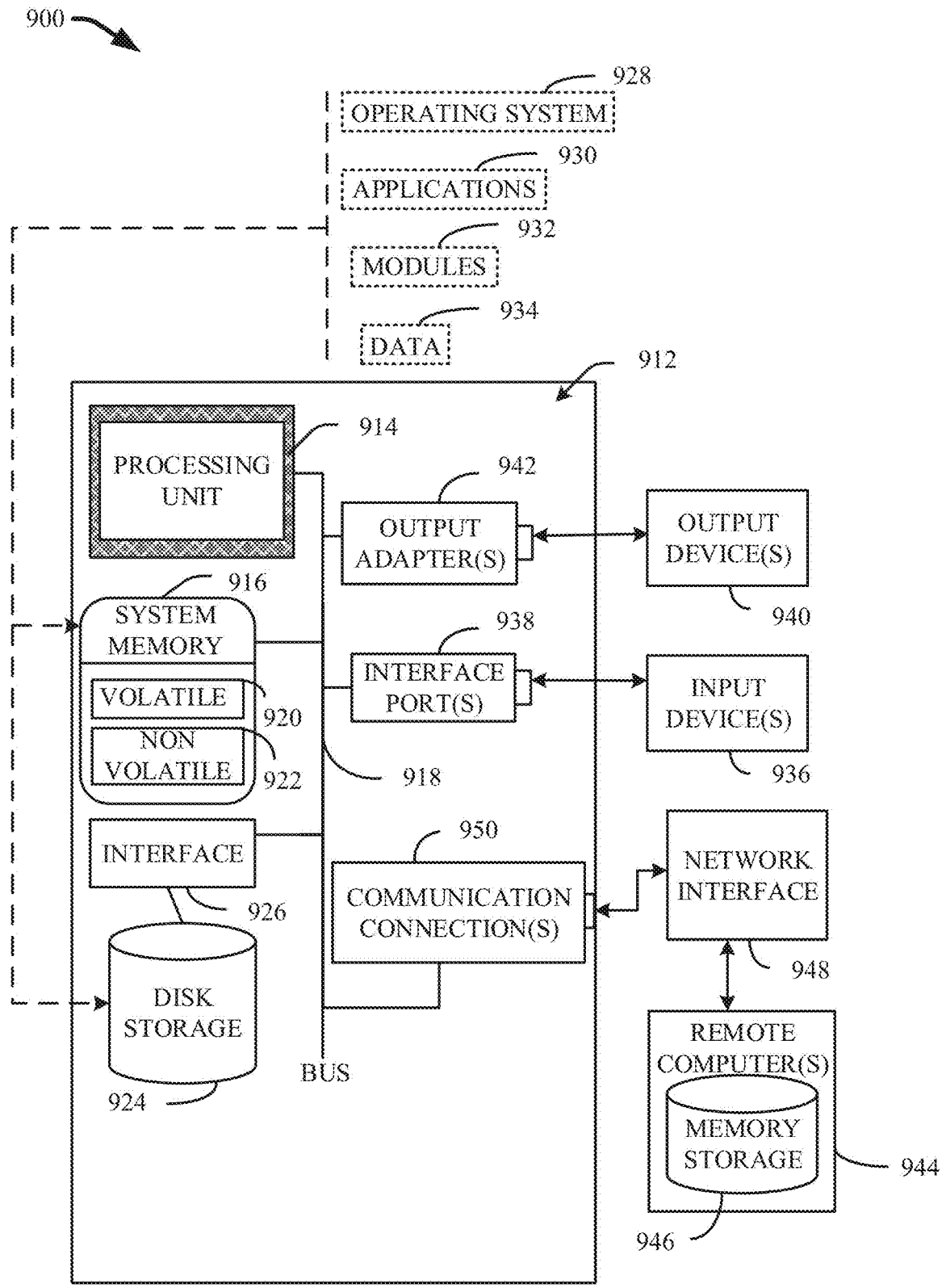
FIG. 9 is a schematic diagram of an example operating environment in accordance with one or more implementations described herein.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 901. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for compressing data during neural network training, comprising:
   a memory that stores computer executable components and neural network data;
   a processor that executes computer executable components stored in the memory, wherein the computer executable components:
      generate a weight matrix, wherein the weight matrix comprises respective weights to be applied to a neural network, and wherein the weight matrix is initialized based on a degree of spatial correlation at the beginning of the training of the neural network, and wherein generation comprises:
         providing corner weights of sub-blocks of respective original sub-components from a distribution of random numbers; and
         employing bilinear interpolation to fill up remaining values;
   and wherein the computer-executable components comprise:
      a receiving component that receives neural network data in the form of the weight matrix;
      a segmentation component that:
         segments the weight matrix into a plurality of original sub-components, wherein respective original sub-components in the plurality of original sub-components comprise a subset of the respective weights in the weight matrix, and wherein selected weights of the respective original sub-components within a defined region have values indicative of a degree of spatial correlation with one another;
      a transform component that applies a transform to the respective original sub-components resulting in data concentrated in a f first frequency segment; and
      a cropping component that crops a second frequency segment comprising high-frequency weights from respective transformed sub-components to generate compressed representations of original sub-components during training of the neural network, wherein the system for compressing data during neural network training results in greater compression ratio at a defined accuracy;

an inverse transform component that performs an inverse transform on the data in the first frequency segment and a remaining area that is padded with zeros, wherein the first frequency segment comprises low frequency data and the inverse transform yields a data block of spatial weights that are an approximate representation of the respective original sub-component, and wherein the system:

trains the neural network employing the data block of spatial weights that are an approximate representation of the respective original sub-component;

determines whether a same training accuracy is achieved as a training task wherein compression is not applied and:

continue neural network training if a same training accuracy is achieved; or vary the degree of spatial correlation and re-initialize the weight matrix based on the degree of spatial correlation if a same training accuracy is not achieved as a training task wherein compression is not applied.

2. The system of claim 1, wherein low-frequency weights are located in a first region of the transformed original sub-components and high-frequency weights are located in a second region of the transformed original sub-components, wherein the first region is located in a corner of the respective transformed original sub-components.

3. The system of claim 1, wherein the inverse transform component applies an inverse discrete cosine transform function to transform the data in the first frequency segment and a remaining area that is padded with zeros to a spatial domain.

4. The system of claim 1, further comprising a communication component that transmits the compressed representations of original sub-components.

5. A computer-implemented method, comprising employing a processor and memory to execute computer executable components to perform the following acts comprising:

generating a weight matrix, wherein the weight matrix comprises respective weights to be applied to a neural network, and wherein the weight matrix is initialized based on a degree of spatial correlation at the beginning of training of the neural network, and wherein the generating comprises:

providing corner weights of sub-blocks of respective original sub-components from a distribution of random numbers; and employing bilinear interpolation to fill up remaining values;

receiving neural network data in the form of the weight matrix, and wherein spatial locality is present in ones of the respective weights in a defined region;

segmenting the weight matrix into a plurality of original sub-components, wherein respective original sub-components comprise a subset of the weights in the weight matrix, and wherein selected weights of the respective original sub-components within a defined region have values indicative of a degree of spatial correlation with one another;

applying a transform to respective original sub-components generating a matrix of frequency domain weights determined based on the spatial weights in the respective original sub-components; and cropping high-frequency weights of the respective transformed original sub-components while retaining low frequency weights generating a set of sub-components comprising the low-frequency weights padded with zeros, wherein the computer-implemented method compresses data during neural network training resulting in lower memory and bandwidth usage by a system employing the computer-implemented method;

performing an inverse transform on the set of sub-components, wherein the set of sub-components comprises low frequency data and the inverse transform yields a data block of spatial weights that are an approximate representation of the respective original sub-component, and wherein the method further comprises:

training the neural network employing the data block of spatial weights that are an approximate representation of the respective original sub-component;

determining whether a same training accuracy is achieved as a training task wherein compression is not applied and:

continuing neural network training if a same training accuracy is achieved; or varying spatial locality and re-initializing the weight matrix based on a degree of spatial correlation if a same training accuracy is not achieved as a training task wherein compression is not applied.

6. The method of claim 5, wherein the applying a transform comprises applying a discrete cosine transform.

7. The method of claim 5, wherein applying an inverse transform comprises applying an inverse discrete cosine transform function to transform the set of sub-components to a spatial domain.

8. The method of claim 5, wherein the set of sub-components area compressed representation of the weight matrix.

9. A computer program product for compressing training data, the computer program product comprising a computer readable storage medium having program instructions embodied therewith, the program instructions executable by a processor to cause the processor to:

generate a weight matrix, wherein the weight matrix comprises respective weights to be applied to a neural network, and wherein the weight matrix is initialized based on a degree of spatial correlation at the beginning of the training of the neural network, and wherein generation comprises:

determining corner weights of sub-blocks of respective original sub-components from a distribution of random numbers; and employing bilinear interpolation to fill up remaining values;

receive neural network data in the form of the weight matrix, and wherein spatial locality is present in ones of the respective weights near one another in a defined region;

segment the weight matrix into original sub-components, wherein respective original sub-components comprise a subset of weights in the weight matrix, and wherein selected weights of the respective original sub-components within a defined region have values indicative of a degree of spatial correlation with one another;

generate a transformation of the original sub-components, wherein low-frequency weights are located in a first region of the transformation of the original sub-components and high-frequency weights are located in a second region of the transformation of the original sub-components;

crop high-frequency weights from the transformation of the original sub-components to generate a set of sub-components comprising low-frequency weights and a remaining area padded with zeros during training of the neural network, wherein the computer program product compresses data during neural network training resulting in improved accuracy in the compression of the training data;

perform an inverse transform on the set of sub-components comprising low-frequency weights, wherein the set of sub-components comprises low-frequency weights and the inverse transform yields a data block of spatial weights that are an approximate representation of a respective original sub-component, and wherein program instructions are further executable by the processor to cause the processor to:

train the neural network employing the data block of spatial weights that are an approximate representation of the respective original sub-component;

determine whether a same training accuracy is achieved as a training task wherein compression is not applied and:

continue neural network training if a same training accuracy is achieved; or vary spatial locality and re-initialize the weight matrix based on a degree of spatial correlation if a same training accuracy is not achieved as a training task wherein compression is not applied.

10. The computer program product of claim 9, wherein the program instructions are further executable by the processor to cause the processor to apply a discrete cosine transform.

11. The computer program product of claim 10, wherein the program instructions are further executable by the processor to cause the processor to apply an inverse discrete cosine transform function to generate the transformation of the original sub-components.

12. The computer program product of claim 9, wherein the program instructions are further executable by the processor to cause the processor to transmit the set of sub-components comprising low-frequency weights.

* * * * *